(12) United States Patent
Barton

(10) Patent No.: US 8,354,139 B1
(45) Date of Patent: Jan. 15, 2013

(54) SYSTEM FOR IMPREGNATING A LINER FOR USE IN UNDERGROUND CONDUIT REPAIR

(76) Inventor: Kenneth S. Barton, Lake Hamilton, FL (US)

( * ) Notice: Subject to any disclaimer, the term of this patent is extended or adjusted under 35 U.S.C. 154(b) by 100 days.

(21) Appl. No.: 12/930,362

(22) Filed: Jan. 5, 2011

(51) Int. Cl.
*B05D 7/22* (2006.01)
(52) U.S. Cl. ............ 427/238; 427/207.1; 427/230; 156/87; 156/286; 156/287
(58) Field of Classification Search .......... 427/207.1, 427/230, 238; 156/87, 286, 287
See application file for complete search history.

(56) References Cited

U.S. PATENT DOCUMENTS

| 4,366,012 A * | 12/1982 | Wood ............................ 156/93 |
| 6,207,002 B1 * | 3/2001 | Odell et al. ................... 156/287 |

\* cited by examiner

*Primary Examiner* — Michael Cleveland
*Assistant Examiner* — Xiao Zhao
(74) *Attorney, Agent, or Firm* — William E. Noonan

(57) ABSTRACT

A system for impregnating a liner with a curable substance enables the liner to be used to repair or refurbish an underground conduit. The system includes a vacuum pump having a vacuum line communicably connected thereto. The vacuum line has a vacuum inlet formed therein. The vacuum line supports the liner such that the liner covers and encloses the inlet. A supply of a curable substance has an applicator line connected thereto. The applicator line is proximate the vacuum line and has a discharge port located proximate the liner supported on the vacuum line. An applicator pump moves the curable substance through the applicator line and discharge port onto the liner while the vacuum pump draws a vacuum on the liner.

13 Claims, 4 Drawing Sheets

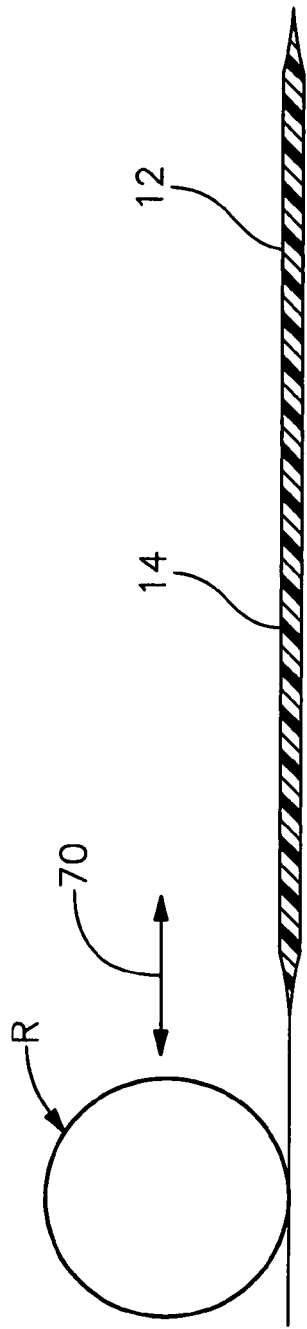
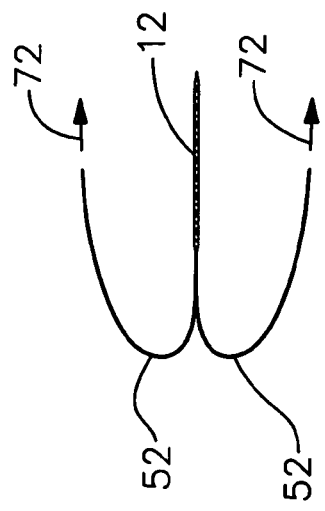

SYSTEM FOR IMPREGNATING A LINER FOR USE IN UNDERGROUND CONDUIT REPAIR

FIELD OF THE INVENTION

This invention relates to a system and related method for vacuum impregnating a flexible, cured in place liner of the type used to repair and refurbish underground conduits. The system and method allow epoxy resin or other hardenable product be applied to the liner much more effectively and efficiently.

BACKGROUND OF THE INVENTION

Cured in place underground pipe repairs have conventionally involved the application of an adhesive bonding substance or other hardenable coating substance to a flexible sleeve or liner. The coated liner is installed within an old, deteriorated, cracked and/or ruptured pipe and allowed to cure in place to effectively repair or refurbish the pipe. This manner of underground pipe and conduit repair is described, for example, in my U.S. Pat. Nos. 4,995,761 and 5,049,003. Traditionally, manhole-to-manhole underground pipe repairs have been performed using a styrene resin as the bonding product. Styrene is toxic, flammable and environmentally unfriendly. As a result, its use in underground conduit repair has been banned in a number of states and is liable to become illegal nationwide in the future.

Alternatively, epoxy resin has been used for cured in place liners. This product is less toxic and flammable, yet stronger than styrene resin. However, epoxy resin and other hardenable coating materials are often very difficult to work with and can be particularly problematic to apply to the liner in a thin, uniform, effective and efficient manner. Conventionally, a large mass of epoxy resin is applied at one end of the cylindrical liner sleeve while the opposite end is vacuumed. The sleeve is then rolled or otherwise worked to spread the epoxy throughout the liner. Such a large mass or lump of epoxy tends to cure fairly quickly, thereby making it very difficult, if not impossible, to apply the epoxy uniformly to the liner. Not only is hardenable product wasted, the resin mass is apt to react and cure before the liner is completely impregnated and installed in the pipe. In some cases, the resin may cure so quickly that the liner is rendered wholly ineffective for use in performing the necessary repairs. This problem is especially acute when the epoxy must be applied to extended liners required for performing lengthy (e.g. 200 foot) manhole-to-manhole repairs.

A system has been developed wherein holes are cut in the liner to introduce epoxy resin into selected spots or locations along the liner. This reduces the problem of applying the epoxy in a mass or lump. However, cutting holes in the liner compromises the integrity of the liner and requires repair of the cut holes themselves.

SUMMARY OF THE INVENTION

It is therefore an object of the present invention to provide a system for efficiently impregnating a cured in place liner that allows epoxy resin and other hardenable coating substances to be much more effectively utilized as a curable agent and as a substitute for previously utilized styrene resin.

It is a further object of this invention to provide a system for impregnating a liner that enables epoxy resin and other types of curable coating substances to be applied to a liner in a thin, uniform and effective manner that enables the liner to better resist premature reacting and curing.

It is a further object of this invention to provide a system for impregnating a cured in place liner that applies the hardenable or curable substance to the liner in a thin uniform coating without forming cuts or holes that can compromise the integrity of the liner and the resultant repairs.

This invention features a system for impregnating a liner with a curable/hardenable substance to enable the liner to be used in repairing or refurbishing an underground pipe. The system includes a vacuum pump having a vacuum line connected communicably thereto. The vacuum line has a vacuum inlet and supports the liner such that the liner covers and encloses the vacuum inlet. A supply of a curable substance has an applicator line connected communicably thereto. The applicator line is disposed proximate the vacuum line and has a discharge port locatable adjacent to the liner supported on the vacuum line. An applicator device is provided for moving the curable substance through the applicator line and the discharge port onto the liner supported on the vacuum line while the vacuum pump is operated to draw a vacuum on the liner.

In a preferred embodiment, the curable substance includes an epoxy resin or other hardenable material, which may optionally bond to the interior of the pipe. The vacuum line may include an elongate tube and the applicator line may include an elongate hose that extends interiorly through the tube. The discharge port may be disposed beyond the vacuum inlet. The vacuum inlet itself may be formed at a distal end of the tube.

The vacuum tube and the applicator hose may have respective longitudinal axes that are substantially parallel to one another. In certain embodiments the hose may extend adjacent and exteriorly to the tube. Multiple applicator tubes may be utilized to transmit respective components of the bonding substance. In such versions, a mixer is utilized to mix these components prior to their application to the liner.

The applicator device may include a pump. Alternatively, the applicator device may feature a pressure pot, a piston, or various other types of mechanisms for driving the curable product through the applicator tube.

This invention also features a method for producing a curable in place liner for use in repairing a rupture in an underground pipe. The method specifically includes providing a vacuum line having a vacuum inlet and supporting a flexible liner on the vacuum line such that the liner covers and encloses the vacuum inlet. A curable substance applicator line is installed proximate the vacuum line. This applicator line includes a discharge port that is located adjacent to the liner. A curable coating substance is moved through the applicator line and discharge port and applied to the liner while a vacuum is simultaneously drawn on the liner.

The method disclosed herein may further include the step of inserting the applicator line interiorly through the vacuum line and locating the discharge port of the applicator line beyond the vacuum inlet and adjacent to the liner. Alternatively, the applicator line may be positioned exteriorly of and adjacent to the vacuum line with the vacuum and applicator lines having respective longitudinal axes that are substantially parallel to one another.

The method of this invention may further include the steps of wrapping the liner over the vacuum line and drawing or pulling the liner longitudinally from the vacuum line as curable substance in small, manageable quantities is being applied to and a vacuum is being drawn on the liner. After the liner is drawn or otherwise removed from the vacuum line, the liner may be rolled to spread the curable substance through the liner. The liner may then be inverted to expose the curable substance prior to applying the liner to the pipe being repaired or refurbished.

DETAILED DESCRIPTION OF PREFERRED EMBODIMENTS

Other objects, features and advantages will occur from the following description of a preferred embodiment and the accompanying drawings, in which:

FIG. 3 is a simplified diagrammatic view of the epoxy impregnated liner being rolled to spread the epoxy through the liner;

FIG. 4 is a simplified diagrammatic view of the impregnated liner being inverted prior to installation of the liner into a pipe to be repaired.

Figure 1:
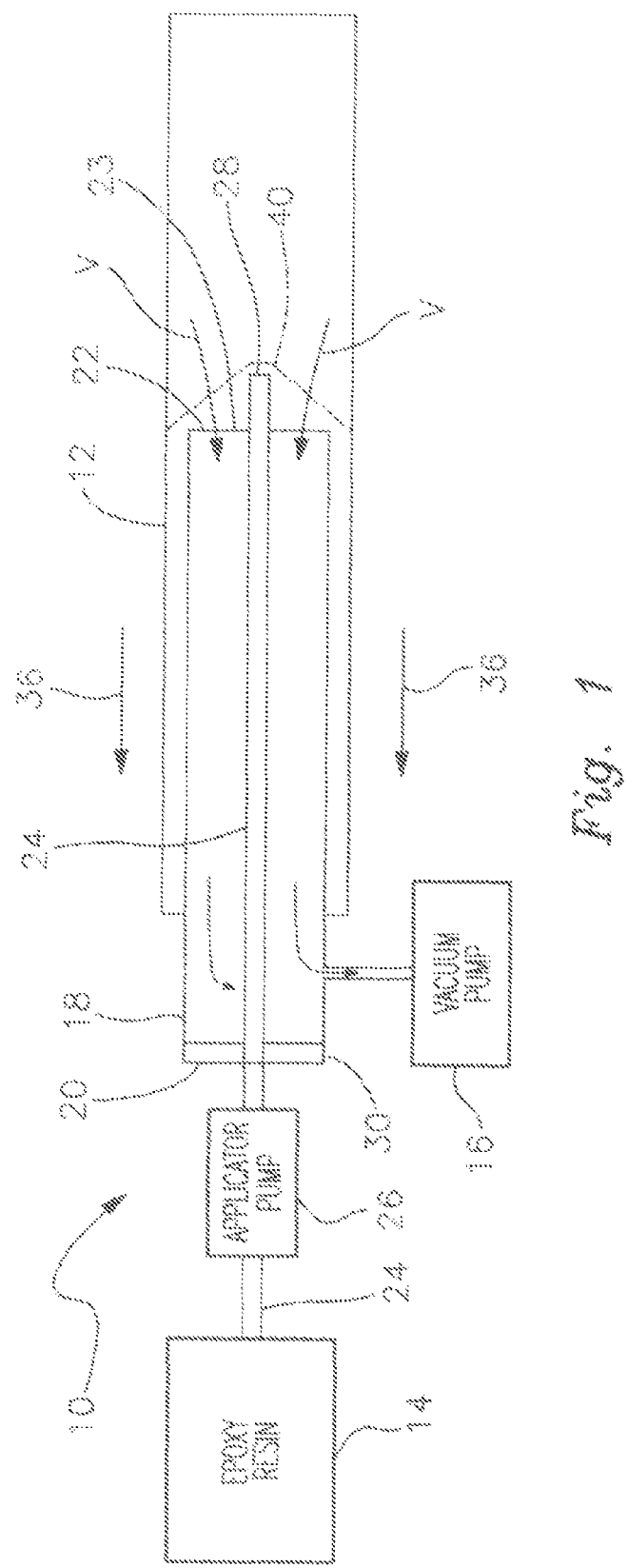
FIG. 1 is a diagrammatic view of a preferred system for impregnating a liner with a curable substance in accordance with this invention.

There is shown in FIG. 1 a system 10 for impregnating a flexible liner 12 with a curable epoxy resin bonding substance 14. It will be understood by persons skilled in the art that various types of liners 12 and curable/hardenable coating substances 14 have been utilized to repair cracks and ruptures in and otherwise refurbish assorted types of underground pipes and conduits including, but not necessarily limited to, sewer lines. Substance 14 may comprise, but is not limited to, a material that allows liner 12 to bond to the pipe being repaired. Liner 12 typically comprises a flexible, yet durable material such as fiberglass, felt or any other flexible, cloth-like liner material capable of being impregnated by a curable substance. The liner may be conventionally assembled as a generally cylindrical sleeve, either before or after the curable substance is applied, so that after the liner is installed, it substantially conforms to the shape of the pipe being repaired. The cloth-like material of the liner includes a thin coating of air impermeable material comprising but not limited to PVC, polyethylene or polyurethane. This coating may be sprayed onto the fabric liner material. This permits a vacuum to be drawn on the liner as explained below.

Various curable coating substances may be utilized in a manner that will also be known to persons skilled in the art. Epoxy resin is preferred and specifically disclosed herein, as the system and method of this invention greatly facilitate the use of this type of bonding substance, particularly in manhole-to-manhole pipe repair applications. The use of epoxy resin is far preferable to conventionally used styrene resin because epoxy is less toxic and flammable and is much more environmentally and governmentally acceptable. Nonetheless, it should be understood that the system and process of this invention may also be utilized with alternative types of curable/hardenable substances.

System 10 includes a vacuum source 16, which preferably comprises a standard vacuum pump. The vacuum pump is communicably connected to an elongate vacuum tube 18, which may comprise a section of PVC pipe or an alternative type of generally rigid, cylindrical conduit. Vacuum line 18 includes a proximal end 20 and a distal end 22 that defines a vacuum inlet 23 as will be described more fully below.

Epoxy resin supply 14 typically comprises a standard two part epoxy of the type commonly used in cured in place liners for underground pipe repairs. Epoxy resin 14 is contained in a drum or other standard type of container and is communicably joined to an applicator line 24, which may comprise a hose, pipe, tube or other type of conduit. A standard applicator pump 26, which is capable of pumping epoxy 14 or other curable substance through applicator hose 24, is operatively connected to the hose. In alternative embodiments, the applicator pump may be replaced by other known means for driving curable product onto the liner. These may include, but are not limited to a pressure pot mechanism, a piston applicator, etc.

Applicator hose 24 is installed interiorly through vacuum line 18 such that the hose extends fully through and beyond the distal end 22 of tubular line 18. A distal end of hose 24 includes an applicator port 28, which may be simply an opening at the end of hose 24 or, alternatively, a separate nozzle or other type of discharge/dispensing port formed at the end of the hose. A seal 30 is interposed between hose 24 and vacuum line at the proximal end 20 of the vacuum line to maintain an effective vacuum within tube 18 during operation of system 10. The discharge port 28 should be disposed beyond the end of vacuum tube 18 such that epoxy resin discharged from hose 24 is not sucked back into vacuum tube 18 during operation of the system.

To impregnate liner 12 with epoxy resin 14, liner 12 is first pulled over the cylindrical vacuum line 18 as indicated by arrows 36. In such versions, liner 12 may be previously assembled as a generally cylindrical sleeve in a manner known in the prior art. Alternatively, a generally flat piece of liner material may be wrapped peripherally about the outer circumference of vacuum line 18. Abutting longitudinal edges of liner 12 may then be provisionally interconnected or secured together. Liner 12 may be flexibly collapsed or "scrunched" along vacuum line 18 to accommodate a liner that is significantly longer than the vacuum line. A leading end 40, shown in phantom, of liner 12 is closed by any suitable type of fastener such that liner 12 covers and encloses the vacuum inlet 23 formed at distal end 22 of vacuum line 18.

Epoxy applicator hose 24 is operably interconnected to pump 26 and is inserted through proximal end 20 of line 18. Hose 24 extends longitudinally through vacuum line 18 such that the respective longitudinal axes of the applicator hose and vacuum line are substantially parallel. As used herein, "substantially parallel" should be understood to mean either exactly or at least generally parallel. The degree of deviation from perfect parallel is not a limitation of this invention. In any event, hose 24 is inserted completely through line 18 such that applicator discharge port 28 is disposed beyond vacuum inlet 23 of line 18. Discharge port 28 is disposed adjacent (i.e. in proximity to) closed leading end 40 of liner 12. It should be understood that, in alternative embodiments, system 10 may first be assembled by inserting applicator hose 24 through vacuum liner 18 in the above described manner before the liner 12 is installed and supported on the vacuum line.

Figure 2:
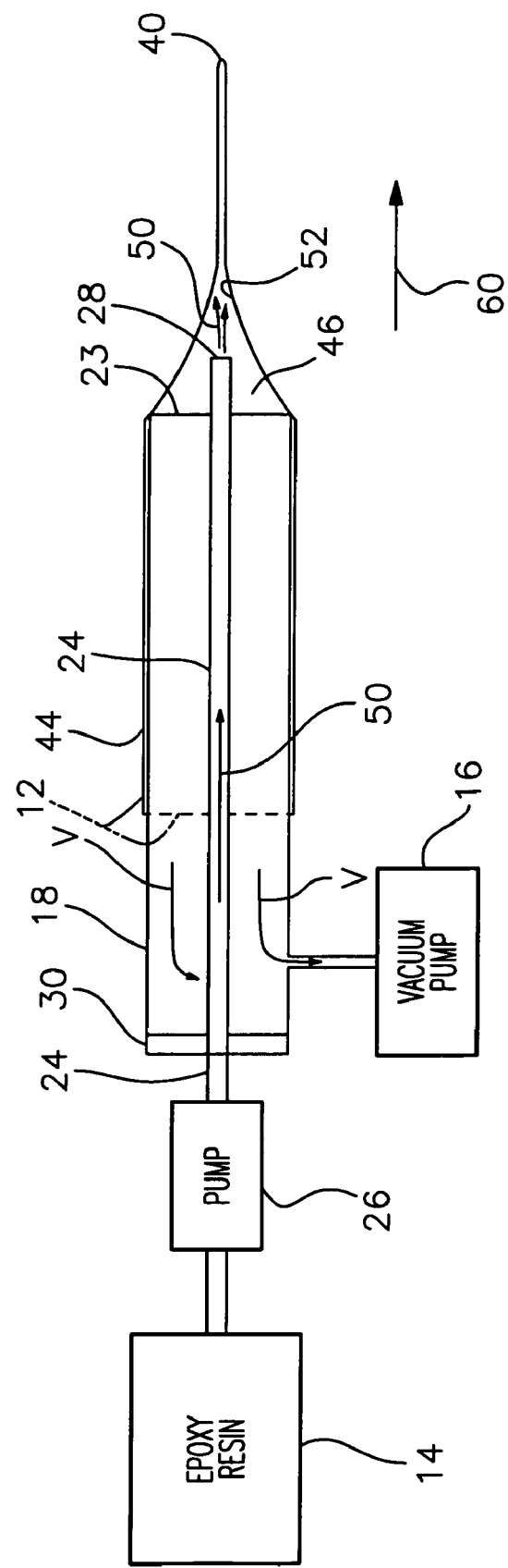
FIG. 2 is a diagrammatic view depicting the system in operation with epoxy resin being applied to a flexible liner as a vacuum is drawn on the liner.

The epoxy impregnation process is performed by simultaneously operating vacuum pump 16 and applicator pump 26 (or other applicator device). Pump 16 draws a vacuum V on liner 12 through vacuum line 18. The air impermeable coating (e.g. PVC, polyethylene, polyurethane) enables a vacuum to be effectively drawn on the liner. As further shown in FIG. 2, vacuum V pulls the liner toward vacuum inlet 23 and causes the trailing portion 44 of liner 12 to be drawn against and snugly engage the outer circumference of vacuum line 18. The space 46 beyond vacuum line 18 that is enclosed by liner 12 shrinks and the liner is brought into very close proximity with discharge port 28 of hose 24. Seal 30 maintains a tight seal between hose 26 and tube 18 at the proximal end 20 of the vacuum line so that an effective vacuum V is maintained within the vacuum line. Simultaneously, pump 26 is operated to move small quantities of epoxy resin 14 (e.g. one gallon at a time) through hose 24. Epoxy product is pumped or otherwise driven through hose 24 and discharged through port 28 as indicated by arrows 50. This pumped epoxy is applied to an interior surface 52 of liner 12. Leading end 40 of liner 12 is pulled gradually, either manually or by a machine, in the direction of arrow 60 such that the liner is gradually removed from the distal end of vacuum line 18. As the liner is gradually moved in this manner, the vacuum and applicator pumps 16 and 26, respectively, continue to operate so that a small, manageable amount of epoxy 14 is applied to the interior surface of liner 12, as indicated by arrows 50. A large lump or mass of epoxy is not deposited on the liner as in the prior art, but rather a smaller and readily manageable quantity (e.g. less than one gallon) of the hardenable product is applied to the interior liner surface as the liner is pulled off of the vacuum line.

After liner 12 has been fully removed from vacuum line 18, the epoxy impregnated liner is rolled by an appropriate rolling machine R, which is operably engaged with liner 12 as indicated by double-headed arrow 70, as shown in FIG. 3. This rolling operation spreads the applied epoxy 14 or other curable substance thinly, evenly and uniformly upon the interior surface of the liner. Because the very manageable quantity of epoxy is rolled into a thin, even layer, it does not cure nearly as quickly as it would if applied to the liner in a relatively large lump or mass as in the prior art. As a result, the liner can be conveniently folded and stored, as required, in a refrigerated compartment. This further slows the curing process.

When eventually needed for use in repairing a rupture or crack in an underground conduit or to refurbish and extend the life of a deteriorated pipe, the epoxy resin impregnated liner 12 is delivered to an installation site. As indicated diagrammatically in FIG. 4, liner 12 may then be inverted (turned inside-out) in the manner shown by arrows 72 within the pipe to be repaired and installed in a conventional manner (e.g. by inflation of a bladder or otherwise). As a result, manhole-to-manhole repairs and refurbishing are performed effectively and efficiently utilizing environmentally benign epoxy resin rather than undesirable, toxic and increasingly restricted styrene resin. The process of this invention effectively impregnates the liner with a thin and even coating of epoxy so that wasteful, inefficient and costly premature curing is avoided.

Figure 5:
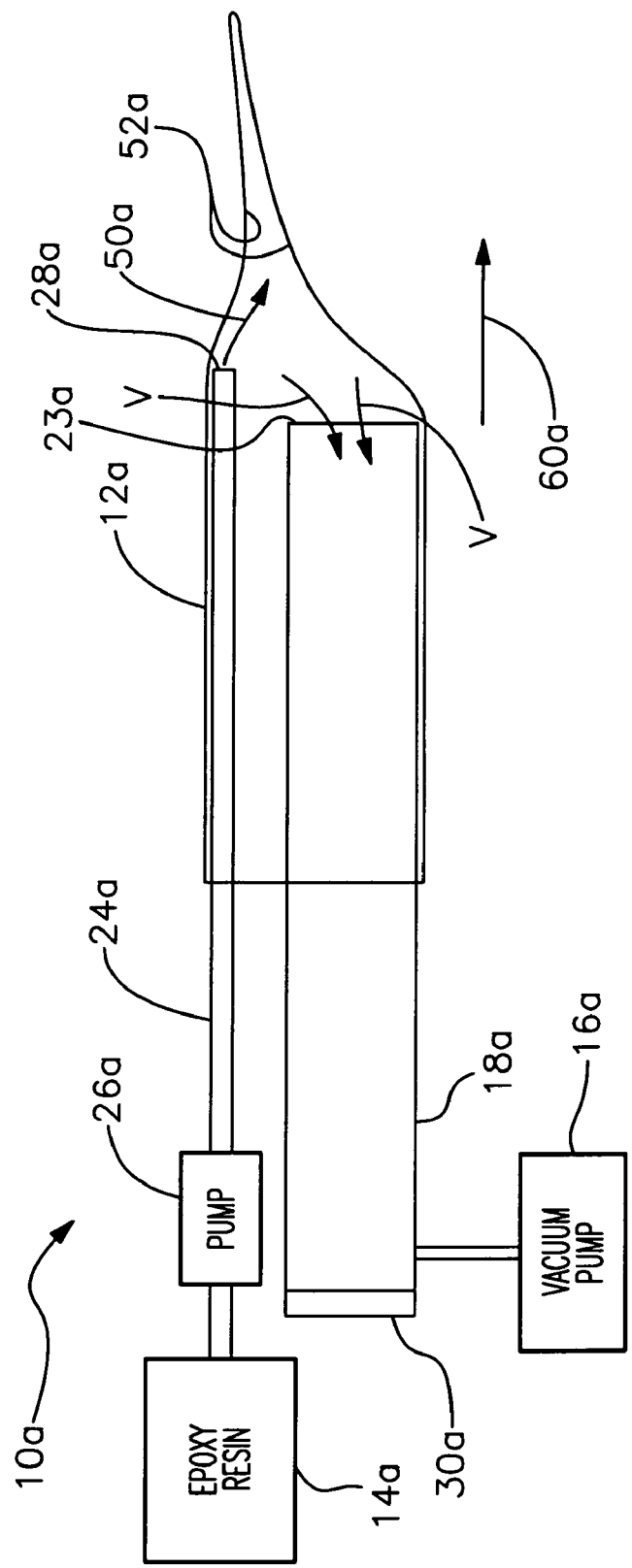
FIG. 5 is a diagrammatic view of an alternative version of the system of this invention wherein the applicator line is disposed exteriorly of the vacuum line.

There is shown in FIG. 5, an alternative system 10_a_ in accordance with this invention. Components analogous to those used in the previously described version are likewise utilized in this embodiment. In particular, system 10_a_ features a vacuum pump 16_a_ that is communicably connected to a tubular vacuum line 18_a_. One end of vacuum line 18_a_ carries a seal 30_a_; the opposite end defines a vacuum inlet 23_a_.

A supply of epoxy 14_a_ is communicably joined to an applicator hose 24_a_. An applicator pump 26_a_ or other positive pressure product driving device is operably connected to hose 24_a_ for pumping or otherwise moving epoxy through the hose. In this embodiment, hose 24 is not inserted through vacuum line 18_a_. Rather it is disposed longitudinally adjacent and exteriorly of the vacuum line. The respective longitudinal axes of the vacuum line and applicator hose are substantially parallel. A discharge port 28_a_ of hose 24_a_ is disposed slightly beyond vacuum inlet 23_a_ of vacuum line 18_a_.

Liner 12_a_ is wrapped about both vacuum line 18_a_ and hose 24_a_ such that vacuum inlet 23_a_ is covered and enclosed by the liner. As in the prior embodiment, the liner may be wrapped, draped, clipped or secured in various manners such that liner 12_a_ is supported over vacuum line 18_a_ and a leading end of the liner is disposed beyond the vacuum line and discharge port 28_a_.

In operation, vacuum 16_a_ and applicator pump 26_a_ are operated simultaneously. A vacuum V is drawn on the liner 12_a_ such that the leading end of the liner is pulled inwardly toward vacuum inlet 23_a_. The periphery of the sleeve-like liner is pulled snug against vacuum line 18_a_ and hose 24_a_. Due to the vacuum drawn on the liner, the inner surface of the liner is brought into close proximity with discharge port 28. Liner 12_a_ is steadily pulled or drawn in the direction of arrow 60_a_ and pump 26_a_ delivers a small, manageable amount of epoxy through hose 24_a_ and discharge port 28_a_ onto liner surfaces 52_a_, as indicated by arrow 50_a_. The liner is again pulled gradually and steadily off of the vacuum line and adjacent applicator hose while a vacuum is maintained against the liner. After the liner is completely removed from the vacuum tube, the liner is rolled or otherwise manipulated, as previously described, to evenly spread the curable product across the interior surface 52_a_ of the liner 129 in a thin, uniform and manageable layer that resists premature curing.

After the liner has been impregnated in the manner shown in FIG. 5, it may again be stored until it needs to be used. The impregnated liner is then installed in a pipe to be repaired, inverted and applied to the pipe in a conventional manner as described above.

In alternative embodiments, applicator hose 12 may be replaced with multiple hoses for carrying respective components or parts of the epoxy resin bonding agent. In such versions, a respective pump or other driving/applicator mechanism may be provided for driving each component through its respective applicator hose. In this embodiment, the parts of the epoxy bonding agent are mixed proximate the discharge ends of the respective applicator lines. Such mixing may be performed by various known types of static mixers.

Accordingly, the present invention allows a standard cured in place liner to be effectively impregnated with epoxy resin and analogous bonding products. The curable bonding substance does not prematurely cure and thereby complicate installation because the epoxy is not applied to the liner is an undesirably large mass or lump that is apt to cure too quickly. Rather, the epoxy is applied in a small, manageable quantity and then manipulated into a relatively thin and uniform layer that makes the liner much easier to work with in cured in place applications. The coated liner can be preserved in an uncured condition for extended periods and until needed for use in cured in place manhole-to-manhole pipe repairs and pipe re-lining and refurbishment projects. Pipe life is thereby extended considerably. The present invention makes it much easier to use epoxy resin rather than flammable, toxic and environmentally unfriendly styrene resin. This process therefore enables underground conduit repairs to be performed with much less of a risk of governmental and regulatory obstructions and in a much safer and more effective manner.

From the foregoing it may be seen that the apparatus of this invention provides for a method and apparatus for vacuum impregnating a flexible cured in place liner of the type used to repair ruptures in underground conduits. The method and apparatus allow epoxy resin to be used effectively and efficiently when performing manhole-to-manhole pipe repairs. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

Other embodiments will occur to those skilled in the art and are within the following claims:

What is claimed is:

1. A method for producing a curable in place liner for use in repairing a rupture, crack or break in an underground pipe, said method comprising:

providing a vacuum line having a vacuum inlet;

supporting a flexible liner on said vacuum line such that said liner surrounds said vacuum line and covers and encloses said vacuum inlet;

installing a curable substance applicator line proximate said vacuum line and locating a discharge port of said applicator line adjacent to the liner, and driving a curable bonding substance through said applicator line and said discharge port to apply said curable substance onto said liner while simultaneously drawing a vacuum on said liner.

2. The method of claim 1 further include inserting said applicator line interiorly through said vacuum line and locating said discharge port beyond said vacuum inlet and adjacent said liner.

3. The method of claim 1 further including positioning said applicator line exteriorly of and adjacent to said vacuum line with said vacuum and applicator lines having respective longitudinal axes that are substantially parallel to one another.

4. The method of claim 1 further including the step of removing said liner longitudinally from said vacuum line after the curable substance is applied to and a vacuum is being drawn on said liner.

5. The method of claim 4 further including the step of rolling said liner to spread the curable substance in a thin layer across said liner.

6. The method of claim 5 further including the step of inverting said liner to expose said bonding substance prior to applying said liner to the pipe being repaired.

7. The method of claim 4 further including the step of pulling a leading end of said liner such that said liner is gradually removed longitudinally from said vacuum line whereby said curable bonding substance is deposited onto longitudinally successive portions of an inner surface of said liner.

8. The method of claim 7 further including the step of rolling said liner to spread said curable substance in a thin layer across said inner surface of said liner.

9. The method of claim 8 further including the step of inverting said liner to expose said inner surface of said liner and said bonding substance deposited onto said inner surface of said liner prior to applying said liner to the pipe being repaired.

10. The method of claim 9 further including the step of rolling said liner to spread said curable bonding substance in a thin layer across said inner surface of said liner.

11. The method of claim 1 in which an amount of curable substance is applied to the liner such that said curable substance maintains an uncured condition as said curable substance is applied to said liner.

12. A method for producing a curable in place liner for use in repairing a rupture, crack or break in an underground pipe, said method comprising:

providing a vacuum line having a vacuum inlet;

supporting an elongate flexible liner on said vacuum line such that said liner surrounds said vacuum line and covers and encloses said vacuum inlet;

installing a curable substance applicator line proximate said vacuum line and locating a discharge port of said applicator line adjacent to said liner;

driving a curable bonding substance through said applicator line and said discharge port to apply said curable bonding substance onto an inner surface of said liner while simultaneously drawing a vacuum on said liner; and pulling a leading end of said liner such that said liner is gradually removed longitudinally from said vacuum line whereby said curable bonding substance is deposited onto longitudinally successive portions of said inner surface of said liner.

13. The method of claim 12 further including the step of inverting said liner to expose said inner surface and said bonding substance prior to applying said liner to the pipe being repaired.

* * * * *